United States Patent
daCosta

(10) Patent No.: US 6,873,937 B2
(45) Date of Patent: Mar. 29, 2005

(54) LINK STRENGTH PREDICTIONS BASED ON SPATIOTEMPORAL CORRELATION OF FEATURES IN PROXIMAL LINKS

(75) Inventor: Behram M. daCosta, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 58 days.

(21) Appl. No.: 10/403,947

(22) Filed: Mar. 31, 2003

(65) Prior Publication Data

US 2004/0204918 A1 Oct. 14, 2004

(51) Int. Cl.⁷ .................................... H04B 17/00
(52) U.S. Cl. .................. 702/188; 702/183; 455/67.11
(58) Field of Search ...................... 702/188, 122, 702/124, 126, 182, 183, 187, 193, 189; 455/66.1, 67.15, 67.7, 3.01, 3.06, 9, 10, 423–425, 115.1–115.4, 436, 67.11, 67.13, 69, 522; 375/213, 224, 225, 228; 340/825.72

(56) References Cited

U.S. PATENT DOCUMENTS

| | | | | |
|---|---|---|---|---|
| 5,465,398 A | * | 11/1995 | Flammer | 455/69 |
| 5,831,874 A | * | 11/1998 | Boone et al. | 703/2 |
| 5,946,631 A | * | 8/1999 | Melnik | 455/522 |
| 6,240,291 B1 | * | 5/2001 | Narasimhan et al. | 455/436 |

OTHER PUBLICATIONS

P. Karttunen et al., Measurement Analysis of Spatial and Temporal Correlation in Wideband Radio Channels with Adaptive Antenna Array, Oct. 1998, Helsinki University of Technology, Finland.

* cited by examiner

*Primary Examiner*—Hal Wachsman
(74) *Attorney, Agent, or Firm*—Blakely, Sokoloff, Taylor & Zafman LLP

(57) ABSTRACT

A memory maintains a first history of link strengths between a first and a second wireless node and a second history of link strengths between a third and a fourth wireless node. A link strength monitor observes link strengths between the nodes. A spatiotemporal correlator is coupled to the memory and the link strength monitor, and performs a spatiotemporal correlation between the first history and the second history, if a change in the link strength between the first and second wireless nodes is observed. A link strength predictor is coupled to the spatiotemporal correlator and the link strength monitor, and uses a result of the spatiotemporal correlation to predict future changes of the link strength between the first and second wireless nodes from observations of the link strength between the third and fourth wireless nodes, if the result of the spatiotemporal correlation is positive and significant.

28 Claims, 2 Drawing Sheets

LINK STRENGTH PREDICTIONS BASED ON SPATIOTEMPORAL CORRELATION OF FEATURES IN PROXIMAL LINKS

BACKGROUND OF THE INVENTION

Wireless data links can be unreliable. In wireless links, fading and shadowing amongst other causes can cause the wireless signal, and hence the corresponding data rate of the transmitted signal, to vary depending on events such as movements of animate and inanimate objects in the environment. The quality of data transmission may vary over space and time.

The variation and lack of reliability in data transmission may cause problems for multimedia streaming applications by causing a sudden decrease in link capacity which causes noticeable artifacts observable by the viewer of the multimedia stream. If such changes in link capacity could be predicted, it would be easier for the multimedia source to change its output data rate to match the expected change in link capacity, since the multimedia source would have more time in which to make the output rate change.

SUMMARY OF THE INVENTION

A memory maintains a first history of link strengths between a first and a second wireless node and a second history of link strengths between a third and a fourth wireless node. A link strength monitor observes link strengths between the nodes. A spatiotemporal correlator is coupled to the memory and the link strength monitor, and performs a spatiotemporal correlation between the first history and the second history, if a change in the link strength between the first and second wireless nodes is observed. A link strength predictor is coupled to the spatiotemporal correlator and the link strength monitor, and uses a result of the spatiotemporal correlation to predict future changes of the link strength between the first and second wireless nodes from observations of the link strength between the third and fourth wireless nodes, if the result of the spatiotemporal correlation is positive and significant.

DETAILED DESCRIPTION OF THE INVENTION

Figure 1:
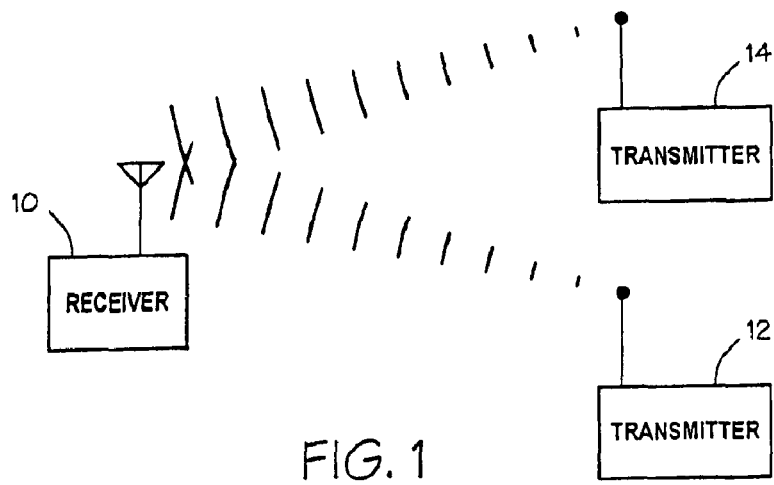
FIG. 1 is a block diagram of a simple wireless network that uses an embodiment of the invention.

As shown in FIG. 1, a wireless network includes a plurality of nodes that are spatially separated. The wireless network may exist in a variety of environments such as a residential home environment. Each node may be a transmitter, a receiver, or both. The wireless network shown in FIG. 1 shows only a first wireless node 10, which is at least a receiver, and a second wireless node 12 and a third wireless node 14, each of which are at least transmitters. The wireless network shown in FIG. 1 is a minimal network in which the invention can be used and shown without obscuring the details of the invention. It will be appreciated that the invention can be used in wireless networks of greatly varying topologies having more nodes than shown in FIG. 1, with each of the nodes possibly taking on more than one role with respect to the invention. The invention may be used with a variety of wireless networks, such as but not limited to 802.11 radio frequency (RF) wireless networks or infrared (IR) wireless networks.

Figure 2:
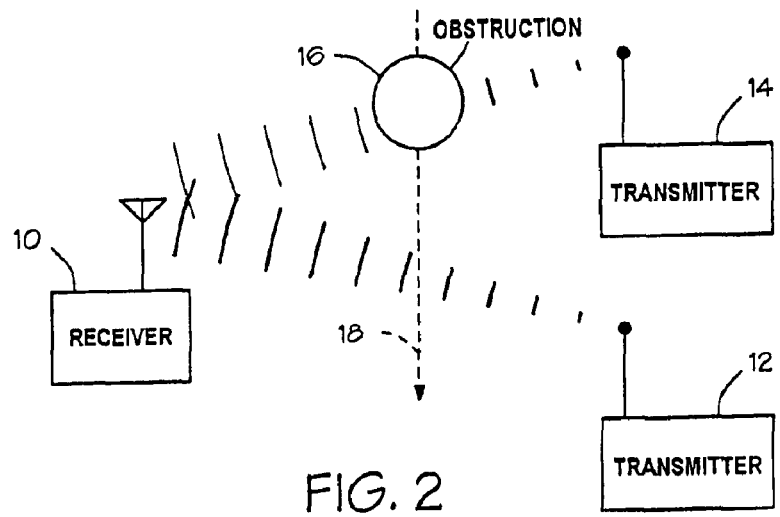
FIG. 2 shows an obstacle moving through the wireless network of FIG. 1.
Figure 4:
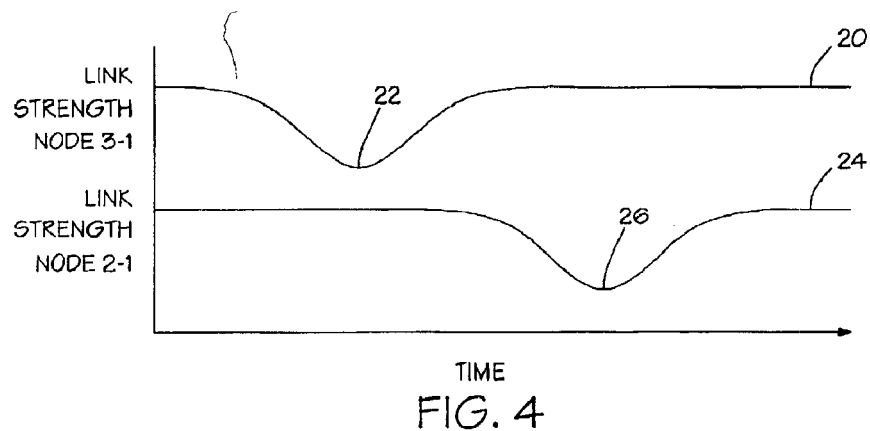
FIG. 4 is a graph of link strengths over time in the wireless network of FIG. 1.

As shown in FIG. 2, the link strength between the third node 14, a transmitter, and the first node 10, a receiver, may be reduced by a moving obstruction 16. Link strength may be indicated by the data rate between nodes, the signal strengths between nodes, or by other measures of the ability of the data link to transmit data. If the obstruction 16 is moving through the wireless network along a path as suggested by the dashed arrow 18, the reduction in signal strength may vary over time. The upper graph in FIG. 4 shows the link strength between the first and third nodes over time 20 as the obstruction 16 moves through the wireless network. The dip 22 represents the time where the obstruction 16 is causing the greatest reduction in link strength as shown in FIG. 2.

Figure 3:
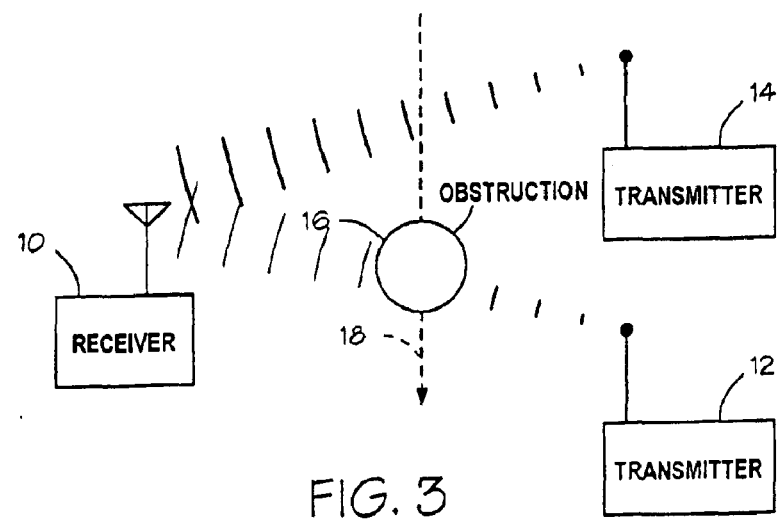
FIG. 3 shows the obstacle moving through the wireless network of FIG. 1 at a later time than FIG. 2.

If the obstruction 16 continues along the path suggested by the dashed arrow 18 as shown in FIG. 2, the obstruction will cause a reduction in signal strength between the second node 12, another transmitter, and the first node 10, as shown in FIG. 3. The lower graph in FIG. 4 shows the link strength between the first and second nodes over time 24 as the obstruction 16 moves through the wireless network. The dip 26 represents the time where the obstruction 16 is causing the greatest reduction in link strength as shown in FIG. 4.

It may be observed that the reduction in link strength between the third node 14 and the first node 10 precedes the reduction in signal strength between the second node 12 and the first node. Thus, the reduction in link strength between the third node 14 and the first node 10 may have predictive value for a reduction in signal strength between the second node 12 and the first node.

Figure 5:
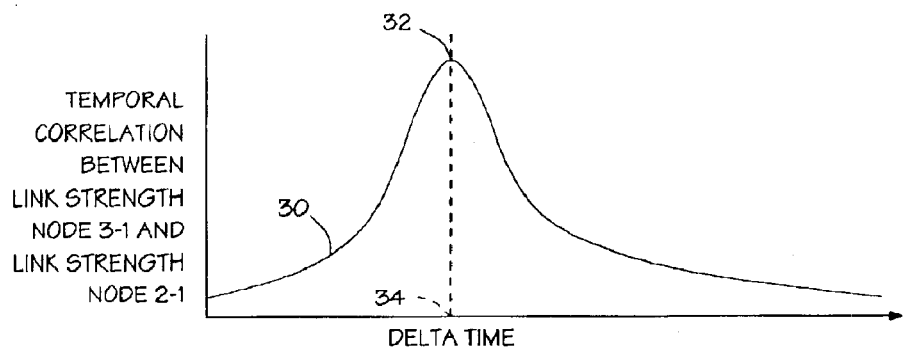
FIG. 5 is a graph of the temporal correlation between the link strengths shown in FIG. 3.

A temporal correlation may be performed on the two link strength signals shown in FIG. 4. The temporal correlation is a function of the correlation between the two signals and a time shift, delta time, between the two signals. FIG. 5 qualitatively represents the temporal correlation 30 of the two link strength signals shown in FIG. 4. A high degree of correlation between the signals 32, a value approaching 1, will be found for a delta time 34 approximately equal to the time difference between the times when the dips 22, 26 (FIG. 4) occurred in the two link strength signals 20, 24.

If the obstruction 16 moved along a simple fixed path with a consistent speed profile, the temporal correlation would be a near perfect predictor for a reduction in signal strength between the second node 12 and the first node 10. It will be appreciated that this is unlikely to be the case. More typically the link strengths will be affected by a variety of obstacles moving at a variety of speeds along a variety of paths. Nonetheless, the concepts of the simplistic predictable obstruction may still be used. When there is greater variability of interfering objects, the temporal correlations between reductions in link strengths will not be as great and may tend to vary over time. Temporal correlations that are reasonably significant, for example a correlation above a threshold value such as 0.4, may still have a useful predictive value.

Histories of link strengths between nodes may be maintained in a memory for a wireless node that is at least a receiver. The histories of link strengths between nodes may be maintained by a device that receives the link strength information and provides link strength predictions to the wireless nodes. The device may be part of the wireless node or a separate device that receives link strength information and provides link strength predictions to the wireless nodes. The link strength histories may be of the link strength between the receiver node and transmitter nodes that transmit to the receiver node. These histories may also be of the link strength between other receiver nodes and transmitter nodes that transmit to those receiver nodes. These histories may also be of a signal strength between other node pairs that are not part of the wireless network, such node pairs possibly being particularly for the purpose of predicting reductions in link strength. Additional nodes may or may not use the same medium as the wireless network.

A link strength monitor may observe the link strength between a wireless node and a transmitter node of interest. When the wireless node experiences a change in link strength from the transmitter node of interest, a spatiotemporal correlation may be performed between the history of the link strength between the wireless node and the transmitter node of interest and other link strength histories. This is a spatiotemporal correlation because the possible use of histories for a plurality of nodes in differing spatial relationships adds an additional functional variable to the correlation. The correlation may in the form of continuous correlations or correlations of pre-defined features, such features existing either in the time domain or frequency domain, in the link strength trends.

If a positive and significant correlation is established by the spatiotemporal correlation, this relationship is used to predict future changes in link strength for the data link between the wireless node and the transmitter node of interest. In one embodiment, a largest positive correlation may be selected from a plurality of candidate predictive node pairs as the predictive relationship. In another embodiment, the relationship may involve a plurality of predictive node pairs chosen such that the spatiotemporal pattern of changes in link strength among the plurality of predictive node pairs provides a prediction of the path of motion for the interfering object to improve the prediction of link strength between the wireless node and the transmitter node of interest.

Figure 6:
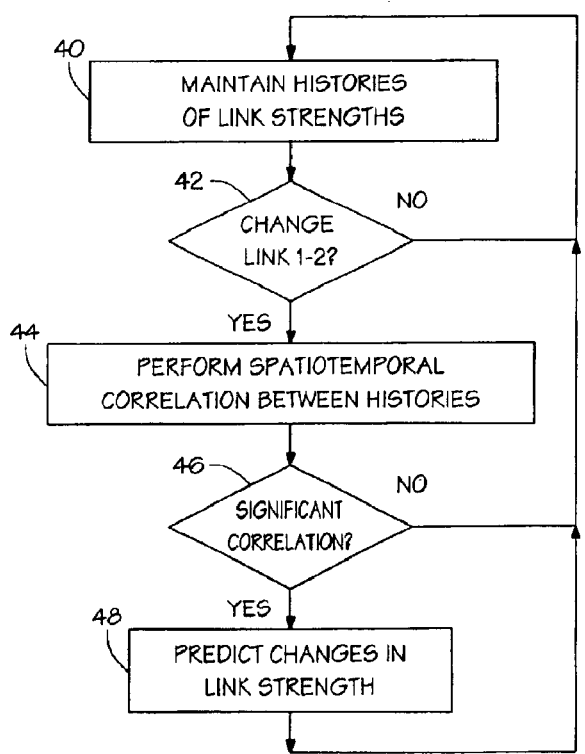
FIG. 6 is a flowchart of a method for an embodiment of the invention.

FIG. 6 is a flowchart of a method for an embodiment of the invention. Histories of link strengths between pairs of nodes are maintained 40. If a change in link strength is observed for a receiver node and a transmitter node pair 42, a spatiotemporal correlation is performed between the link strength history for the receiver-transmitter node pair and the remaining link strength histories 44. If a significant correlation result is found 46, the correlation result is used to predict future changes in link strength for the receiver-transmitter node pair 48.

It will be appreciated that a computer processor may be used to perform all or part of the operations in an embodiment of the invention. The processor may execute a sequence of instructions to perform the method of predicting wireless link strength. The sequence of instructions may be in a computer readable medium such as a read-only memory, a magnetic or optical disk, or other medium capable of providing a sequence of instructions to a computer processor.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A device for predicting wireless link strength, comprising:
   a memory to maintain a first history of link strengths between a first wireless node and a second wireless node and a second history of link strengths between a third wireless node and a fourth wireless node;
   a link strength monitor to observe a link strength between the first wireless node and the second wireless node and between the third wireless node and the fourth wireless node;
   a spatiotemporal correlator coupled to the memory and the link strength monitor, the spatiotemporal correlator to perform a spatiotemporal correlation between the first history and the second history, if a change in the link strength between the first wireless node and the second wireless node is observed; and,
   a link strength predictor coupled to the spatiotemporal correlator and the link strength monitor, the link strength predictor to use a result of the spatiotemporal correlation to predict future changes of the link strength between the first wireless node and the second wireless node from observations of the link strength between the third wireless node and the fourth wireless node, if the result of the spatiotemporal correlation is positive and significant.

2. The device of claim 1, wherein the link strength monitor observes a data rate.

3. The device of claim 1, wherein the link strength monitor observes a signal strength.

4. The device of claim 1, wherein the spatiotemporal correlator performs continuous correlations.

5. The device of claim 1, wherein the spatiotemporal correlator performs correlations of pre-defined features in link strength trends.

6. The device of claim 5, wherein the pre-defined features exist in one of a time domain or a frequency domain.

7. The device of claim 1, wherein the first wireless node is the third wireless node.

8. A method for predicting wireless link strength, comprising:
   maintaining a first history of link strengths between a first wireless node and a second wireless node and a second history of link strengths between a third wireless node and a fourth wireless node;
   performing a spatiotemporal correlation between the first history and the second history, if a change in the link strength between the first wireless node and the second wireless node is observed; and,
   predicting future changes of the link strength between the first wireless node and the second wireless node from observations of the link strength between the third wireless node and the fourth wireless node using a result of the spatiotemporal correlation, if the result of the spatiotemporal correlation is positive and significant.

9. The method of claim 8, wherein link strength is determined from a data rate.

10. The method of claim 8, wherein link strength is determined from a signal strength.

11. The method of claim 8, wherein the spatiotemporal correlation is in the form of continuous correlations.

12. The method of claim 8, wherein the spatiotemporal correlation is in the form of correlations of pre-defined features in link strength trends.

13. The method of claim 12, wherein the pre-defined features exist in one of a time domain or a frequency domain.

14. The method of claim 8, wherein the first wireless node is the third wireless node.

15. A device for predicting wireless link strength, comprising:

first means for maintaining a first history of link strengths between a first wireless node and a second wireless node and a second history of link strengths between a third wireless node and a fourth wireless node;

second means for observing the link strength between the first wireless node and the second wireless node;

third means for performing a spatiotemporal correlation between the first history and the second history, if a change in the link strength between the first wireless node and the second wireless node is observed;

fourth means for observing the link strength between the third wireless node and the fourth wireless node; and, fifth means for predicting future changes of the link strength between the first wireless node and the second wireless node from observations of the link strength between the third wireless node and the fourth wireless node using a result of the spatiotemporal correlation, if the result of the spatiotemporal correlation is positive and significant.

16. The device of claim 15, wherein link strength is determined from a data rate.

17. The device of claim 15, wherein link strength is determined from a signal strength.

18. The device of claim 15, wherein the spatiotemporal correlation is in the form of continuous correlations.

19. The device of claim 15, wherein the spatiotemporal correlation is in the form of correlations of pre-defined features in link strength trends.

20. The device of claim 19, wherein the pre-defined features exist in one of a time domain or a frequency domain.

21. The device of claim 15, wherein the first wireless node is the third wireless node.

22. A computer-readable medium having sequences of instructions, the sequences of instructions, when executed by a processor, causing the processor to perform a method for predicting wireless link strength, the sequences of instructions comprising:

a first sequence of instructions for maintaining a first history of link strengths between a first wireless node and a second wireless node and a second history of link strengths between a third wireless node and a fourth wireless node;

a second sequence of instructions for performing a spatiotemporal correlation between the first history and the second history, if a change in the link strength between the first wireless node and the second wireless node is observed; and a third sequence for of instructions predicting future changes of the link strength between the first wireless node and the second wireless node from observations of the link strength between the third wireless node and the fourth wireless node using a result of the spatiotemporal correlation, if the result of the spatiotemporal correlation is positive and significant.

23. The computer-readable medium of claim 22, wherein link strength is determined from a data rate.

24. The computer-readable medium of claim 22, wherein link strength is determined from a signal strength.

25. The computer-readable medium of claim 22, wherein the spatiotemporal correlation is in the form of continuous correlations.

26. The computer-readable medium of claim 22, wherein the spatiotemporal correlation is in the form of correlations of pre-defined features in link strength trends.

27. The computer-readable medium of claim 26, wherein the pre-defined features exist in one of a time domain or a frequency domain.

28. The computer-readable medium of claim 22, wherein the first wireless node is the third wireless node.

* * * * *